United States Patent
Margetts et al.

[15] 3,661,233
[45] May 9, 1972

[54] INTERNAL SHOE DRUM BRAKES

[72] Inventors: Hugh Grenville Margetts; Gordon Alfred Habgood, both of Warwickshire, England

[73] Assignee: Girling Limited, Birmingham, England

[22] Filed: Feb. 24, 1970

[21] Appl. No.: 13,597

[30] Foreign Application Priority Data

Mar. 1, 1969  Great Britain.....................11033/69
Dec. 12, 1969  Great Britain.....................60631/69

[52] U.S. Cl. ..........................................188/106 A, 29/190
[51] Int. Cl. ..........................................F16d 65/22
[58] Field of Search ...............188/79.5 R, 106 A; 29/180 A, 29/190, 193; 74/519

[56] References Cited

UNITED STATES PATENTS

2,924,116  2/1960  Abbott...........................188/106 A X
3,064,767  11/1962  Wieger..........................188/106 A X Primary Examiner—Duane A. Reger
Attorney—Scrivener, Parker, Scrivener and Clarke

[57] ABSTRACT

A mechanical actuator for separating adjacent ends of shoes of a shoe-drum brake includes an angularly movable lever pivotally connected to one of the shoes. The lever is constructed from a blank having a body portion of substantial length which is formed at one end with an outwardly extending lug. The lug and an adjacent part of the body portion are provided with an opening having portions of different dimensions to permit the insertion and retention therein of a boss at the free end of a brake applying member for which at least a part of the lug forms an abutment.

13 Claims, 16 Drawing Figures

PATENTED MAY 9 1972 3,661,233

INTERNAL SHOE DRUM BRAKES

This invention relates to internal shoe- drum brakes of the kind in which arcuate shoes carrying friction linings for engagement with a rotatable drum are mounted on a stationary back plate, and adjacent shoe ends are separated in the application of the brake by a mechanical actuator comprising an angularly movable lever pivotally connected at one end to one shoe and coupled to the other to applying means, such as a flexible cable, and a strut acting between the lever at an intermediate point in its length and the other shoe. More particularly our invention is concerned with providing an improved blank for the construction of a lever for use in a mechanical actuator of an internal shoe drum brake of the kind set forth.

According to our invention a blank for the construction of a lever for use in a mechanical actuator of a shoe-drum brake of the kind set forth comprises a body portion of substantial length having adjacent to one end an opening adapted to receive a pivotal connection with a web of a brake shoe and having at the other end a lug projecting from one edge of the body portion and lying in the same plane as the body portion, and an opening formed in the lug and an adjacent part of the body portion includes portions of different dimensions of which one portion of the opening disposed at least in part in the lug is of a width slightly greater than the diameter of a flexible inextensible member for moving the lever angularly, and the other portion is of dimensions slightly greater than those of a boss at the outer end of the flexible inextensible member. The blank may be flat and is produced from a metal plate by a single blanking operation.

Preferably the said other portion of the opening is disposed within the body portion and is of circular outline of a diameter slightly greater than that of the boss, and the said one portion of the opening is of parallel sided elongated outline. Thus the opening is of the outline of a "key-hole" slot.

Alternatively the lug and the adjacent body portion may comprise an integral extension of substantially U or Vee outline formed by a pair of limbs of which the limbs define between adjacent edges an open-ended opening including an inner portion of a width slightly less than the diameter of the boss and an outer portion of a width slightly greater than the diameter of the boss.

The lever is constructed from the blank by deforming the lug through substantially 90 along a fold line traversing the said one portion of the opening to form an abutment for the inner end of the boss which lies in a plane normal to the plane of the body portion.

The flexible inextensible member is attached to the lever by passing the boss through the circular opening or outer portion from the face of the body portion remote from the abutment. The boss and the adjacent end of the member are then moved axially along the slot until the inextensible member abuts against the outer end of the parallel sided or inner portion and, upon withdrawing the inextensible member, the boss abuts against the abutment, there being no tendency for this movement to be impeded.

Preferably, in the blank, the main longitudinal axis of the opening in the lug subtends an angle greater than 90° with respect to the main axis of the body portion, and the fold line is substantially normal to the longitudinal axis of the opening, Thus, when the lug is deformed as described above, the abutment lies in a plane substantially parallel or inclined slightly with respect to a plane containing the main longitudinal axis of the body portion.

Our construction of lever has the advantage that only two operations are required to produce it, namely a blanking operating, and a raising or other suitable deforming operation to deform the abutment from the blank.

Some embodiments of our invention are illustrated in the accompanying drawings in which.

Figure 1:
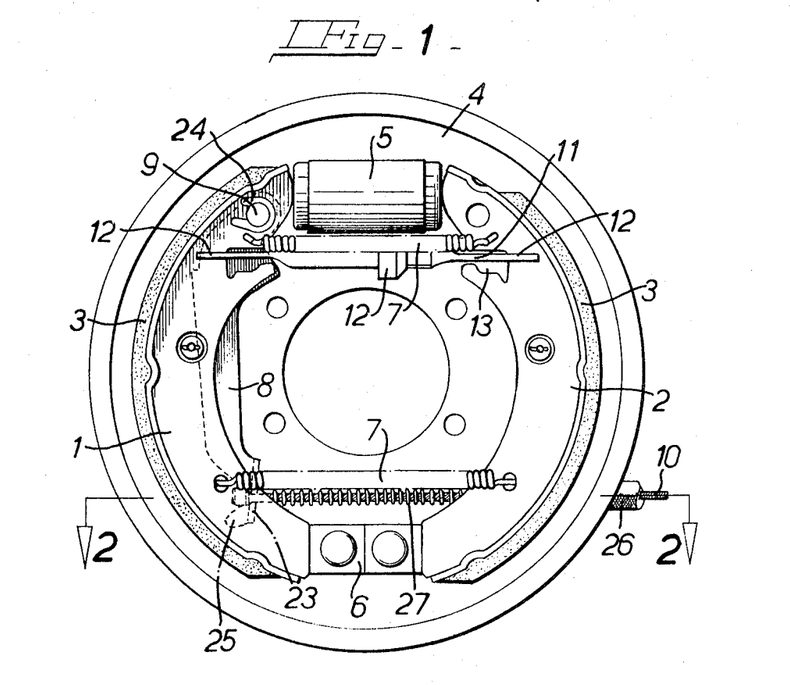
FIG. 1 is an elevantion of an internal shoe-drum brake with the drum removed for clarity.
Figure 2:
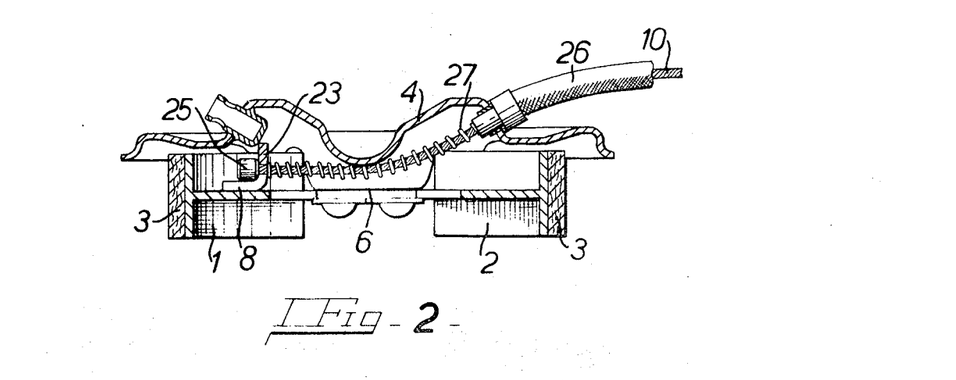
FIG. 2 is a part section of the line 2—2 of FIG. 1.

The internal shoe-drum brake illustrated in FIGS. 1 and 2 comprises a pair of arcuate shoes 1, 2, carrying friction linings 3 for engagement with a rotatable drum (not shown). The shoes 1,2, are mounted on a stationary back-plate 4 and, for normal service braking, are adapted to be separated at adjacent ends by a double ended hydraulic piston and cylinder assembly 5 mounted on the back-plate 4 between that pair of shoe ends. At their opposite ends the shoes 1, 2 fulcrum on a stationary abutment 6 secured to the back-plate and which takes the torque on the shoes when the brake is applied.

In the off position of brake the shoes are held out of engagement with the drum by pull-off springs 7 connected between the shoe webs.

For emergency or parking braking the brake is applied mechanically by a mechanical actuator. The mechanical actuator comprises a lever 8 pivotally connected at one end to the web of the trailingshoe 1 at a position adjacent to the hydraulic actuator 5, by means of a pivot pin 9. The free end of the lever is coupled to a flexible inextensible cable 10 which enters the brake through an opening in the brake-plate and, at an intermediate point in its length, the lever acts on one end of a strut 11 of which the other end engages with the web of the leading shoe 2. The effective length of the strut 11 is adjustable to take up the braking clearances and compensate for wear of the friction linings 3 by automatic adjuster means 12. Opposite ends of the strut 11 are provided with bifurcated portions 12 which straddle the webs of the shoes,and the bases of the bifurcated portions12 engage with an edge of the lever and the base of a slot 13 in the web of the trailing shoe 2, respectively.

Figure 3:
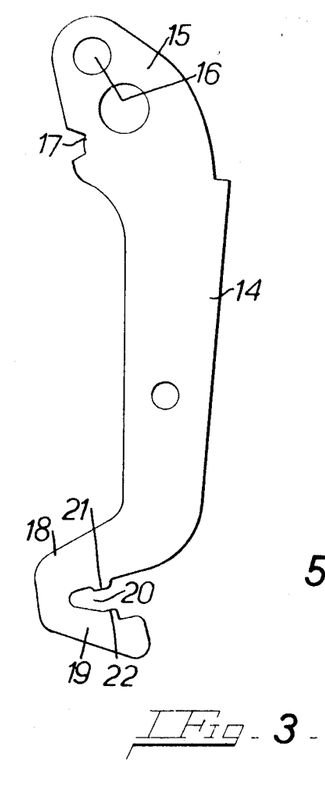
FIG. 3 is a side elevation of a blank for the construction of a lever for use in the mechanical actuator incorporated in the brake of FIGS. 1 and 2.

In one construction in accordance with our invention the lever 8 is shown in detail in FIGS. 4 to 8 and is constructed from a blank illustrated in FIG. 3. The blank illustrated in FIG. 3 comprises a main body portion 14 of substantial length having at one end an end portion 15 inclined with respect to the main axis of the body portion, and provided adjacent its outer end with an opening 16 adapted to receive the pivot pin 9. A notch 17 is formed in the innermost edge of the end portion 15 to locate the end of the strut 11 when the lever 8 is assembled in the brake. The opposite end of the body portion 14 leads into a continuous limb 18 which is inclined with respect to the main axis of the body portion and extends beyond the same edge of the body portion as the portion 15. The limb 18 leads into a reverse limb 19 extending in the opposite direction and spaced from the limb 18. The limbs 18 and 19 define between adjacent edges an open ended slot 20. The width of the slot 20 increases progressively in an outward direction for a short distance leading into a portion of constant width between a projection 21 on the limb 18 and a portion 22 on the limb 19 which is parallel with and of substantially the same length as the inner end of the projecting 21. Thereafter the width of the slot increases substantially. The blank described above is produced in a single blanking operation.

Figure 4:
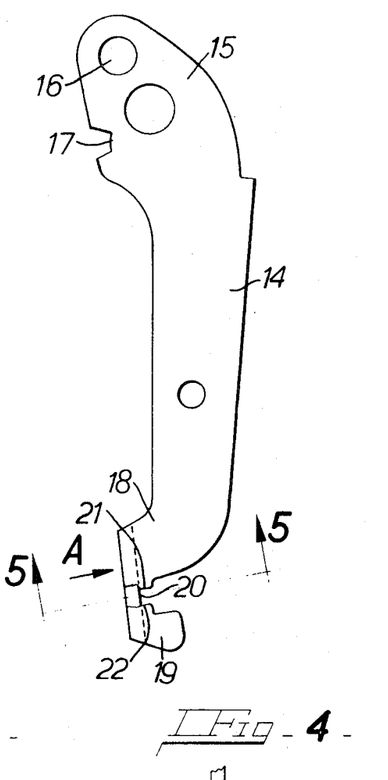
FIG. 4 is a side elevation of a lever constructed from the blank of FIG. 3.
Figure 5:
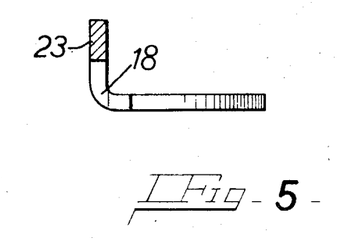
FIG. 5 is a section of the line 5—5 of FIG. 4.
Figure 6:
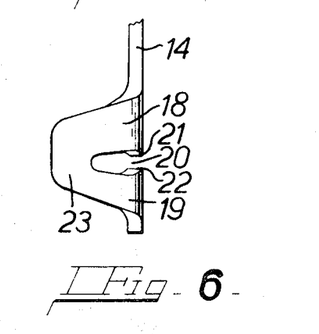
FIG. 6 is a view in the direction of the arrow A in FIG. 5.

To construct the lever 8 from the blank, portions of the limbs 18 and 19 are raised about a fold line which is located to the side of the projection 21 and the parallel portion 22 adjacent to the common outer ends of the limbs 18 and 19 as shown in chain dotted lines in FIG. 4. The raised limb portions form an abutment 23 lying in a plane substantially at right angles to the plane of the body portion 14 with the abutment 23 having a central opening which is restricted or "necked" at its outer end.

The lever 8 so produced is mounted in the brake described above with the main body portion 14 lying against the underside of the web of the leading shoe 1 with the notch 17 remote from the shoe platform or flange carrying the friction lining 3. The abutment 23 extends towards the back-plate 4 in a direction substantially at right angles thereto. The lever 8 is coupled to the web of the shoe 1 by the pivot pin 9 which passes through the opening 16 and is held in position by a circlip or other spring ring 24.

The free end of the cable 10 carries a boss 25 which is normally urged away from a casing 26 enclosing the cable 10 by means of a compression spring 27. By moving the lever 8 angularly in a brake applying direction, into a position in which the abutment 23 lies outside the projected area of the shoe web enables the flexible cable 10 to be inserted into the opening past the restriction or necking in the side of the lever remote from the back plate 4, after retraction of the compression spring 27. In this position the inner end of the boss 25 abuts against the face of the abutment 23 adjacent to the platform or flange of the leading shoe 1.

The opening 20 in which the cable is received is inclined relative to the main axis of the body portion 14 of the lever 8 to ensure that the edge of the opening defined by the limb 18 is parallel with the line of the cable 10 when the brake is in the fully "on" position.

Figure 7:
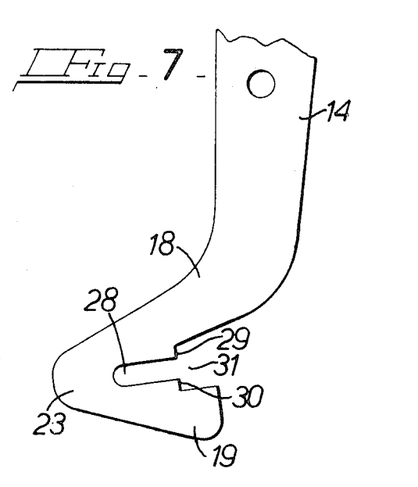
FIG. 7 is a side elevation similar to FIG. 3 but showing a modification.

The blank illustrated in FIG. 7 is a modification of the blank described above with reference to FIGS. 3 of the drawings. In the construction of FIG. 7 the open-ended slot 20 defined between adjacent edges of the limbs 18 and 19 is formed with a parallel sided slot portion 28 which leads from the closed inner end of the slot 20 to aligned steps 29 and 30 spaced rearwardly from the abutment 23. The steps 29 and 30 at their inner ends lead into a slot portion 31 of increased width. The slot portion 31 is of a width greater than the diameter of the boss 25, and the slot portion 28 is of a width greater than the diameter of the cable 10 but less than the diameter of the boss 25.

Figure 8:
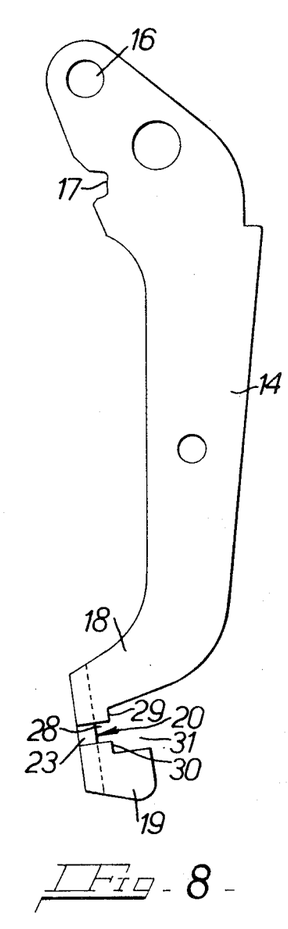
FIG. 8 is a side elevation of a lever constructed from the blank of FIG. 7.
Figure 9:
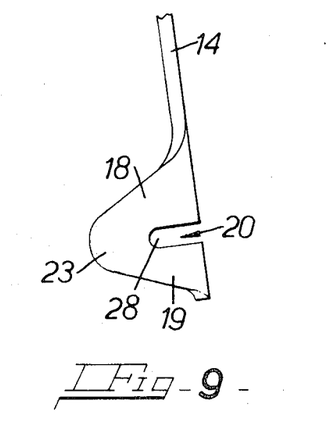
FIG. 9 is an end elevation of a portion of the lever shown in FIG. 7.
Figure 10:
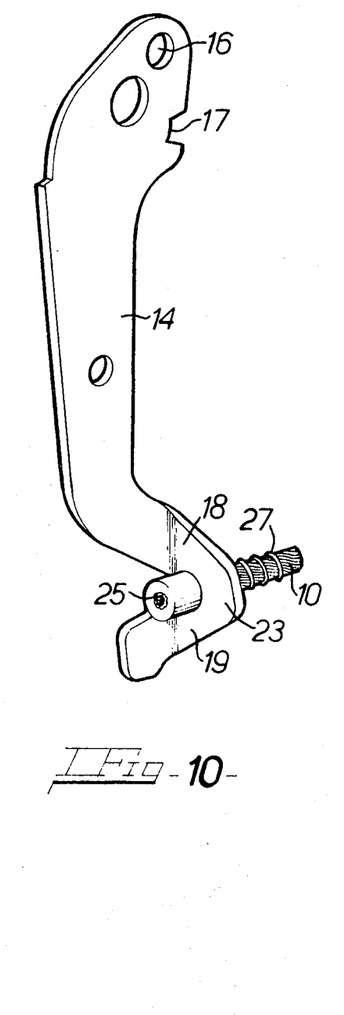
FIG. 10 is a perspective view in one direction of the lever in combination with a cable to form an assembly.
Figure 11:
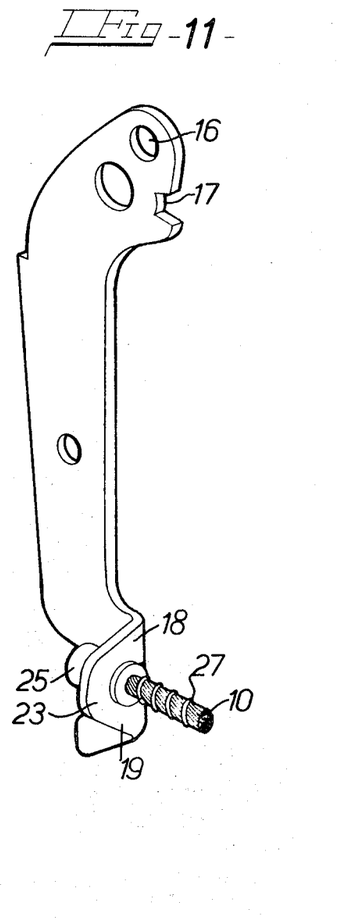
FIG. 11 is a perspective view similar to FIG. 10 but taken in a different direction.

The lever illustrated in FIGS. 8 and 9 of the drawings is constructed from the blank of FIG. 7 in the same manner as that described above with reference to FIGS. 3 to 6 of the drawings, and need not be described further herein.

Figures 12, 13, 14:
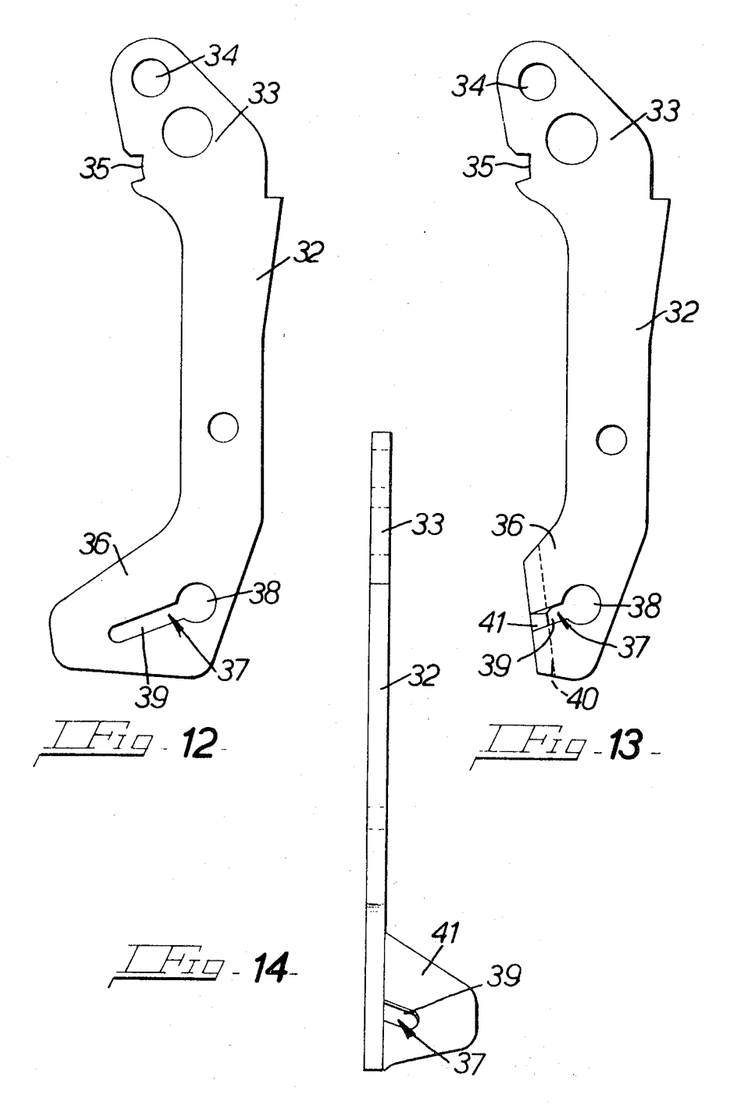
FIG. 12 is a side elevation of a blank for the construction of a further embodiment of lever for use in the mechanical actuator incorporated in the brake of FIGS. 1 and 2.
FIG. 13 is a side elevation of a lever constructed from the blank of FIG. 12.
FIG. 14 is an end elevation of the lever of FIG. 13.

The lever 8 incorporated in the drum brake illustrated in FIGS. 1 and 2 may also be constructed from the blank illustrated in FIG. 12, which comprises a main body portion 32 of substantial length having at one end an end portion 33. The end portion 33 is inclined with respect to the main axis of the body portion, and is provided adjacent its outer end with an opening 34 adapted to receive the pivot pin 9. A notch 35 is formed in the innermost edge of the end portion 32 to locate the end of the strut 11 when the lever 8 is assembled in the brake. The opposite end of the body portion 32 leads into outwardly projecting lug 36 which is inclined with respect to the main axis of the body portion 32 and extends beyond the same edge of the body portion as the portion 33. The lug 36 and an adjacent part of the body portion 32, with which the lug 36 is continuous, are provided with an opening in the form of a slot 37 of generally key hole outline. The slot 37 includes a portion 38 of generally circular outline located within the body portion 32 and the portion 38 is slightly greater in diameter than that of the boss 25 on the free end of the cable 10. The portion 38 is continuous with a parallel sided elongated portion 39 of which the width is slightly greater than the diameter of the cable 10. The main axis of the slot 37 is inclined downwardly with respect to a normal to the main longituduinal axis of the body portion 32.

The blank described above with reference to FIG. 12 is produced in a single blanking operation.

To construct the lever 8 from the blank of FIG. 4, a portion of the lug 36 between its free end and at intermediate point in its length is raised about a fold line 40 which traverses the elongated portion 39 of the slot. The fold line 40 is substantially at right angles to, or inclined slightly towards, in an upward direction, a normal passing through the main axis of the slot 37. The raised portion of the lug 36 forms an abutment 41 substantially at right angles to the body portion 32 in which the portion 39 of the slot 37 extends in a downward direction towards its outer end (FIG. 14).

The lever 8 so produced is mounted in the brake illustrated in FIGS. 1 and 2 in the same manner as that of the levers described above, with the main body portion 32 lying against the underside of the web of the leading shoe 11 and the notch 35 lying remote from the platform or flange of the shoe 1. The abutment 41 extends towards the back-plate 41, in a direction substantially at right angles thereto, and the lever is coupled to the shoe web by the pivot pin 9 which passes through the opening 34 and is held in position by the circlip or other spring ring 24.

Figure 15:
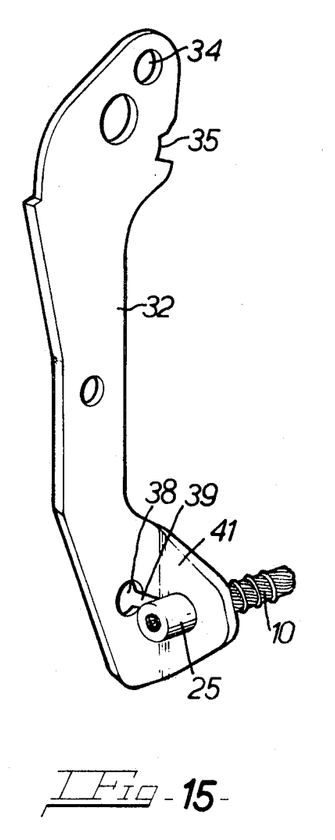
FIG. 15 is a perspective view in one direction of the lever illustrated in FIGS. 13 and 14 in combination with a cable.
Figure 16:
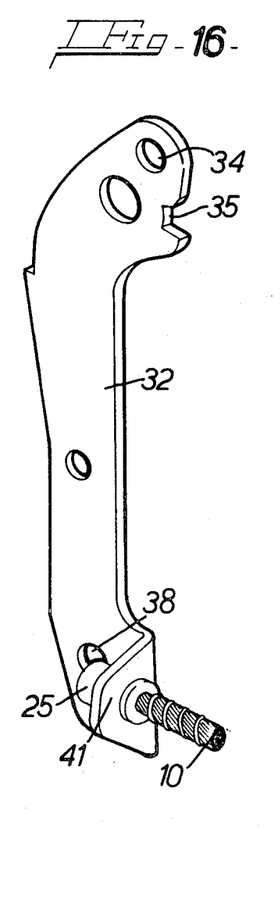
FIG. 16 is a perspective view similar to FIG. 15 but taken in a different direction.

As described above, the free end of the cable 10 which carries the boss 25 is normally urged away from the casing 26 enclosing the cable 10 by means of a compression spring 27. By moving the lever 8 angularly in a brake applying direction, into a position in which the abutment 41 lies outside the plane of the shoe web, enables the boss 25 to be inserted through the slot portion 38 from the face of the body portion 32 adjacent to the shoe web, after retraction of the compression spring 27. The portion of the cable 10 adjacent to the boss 25 is then slid along the slot until it abuts against the closed outer end of the portion 39 (FIGS. 15 and 16). In this position, the boss 25 abuts against the face of the abutment 41 adjacent to the platform or flange of the leading shoe 1.

Since the portion 39 of the slot 37 in which the cable is received, is inclined downwardly relative to the main axis of the body portion 32 of the lever 8, facilitates insertion of the cable 10 into the lever 8. The inclination of the abutment 41 relative to the body portion 32 ensures that the abutment 41 is normal to the boss 25, when the brake is in the fully "on" position, thereby reducing to a minimum deflection of the cable 10 under tension.

We claim:

1. For the construction of a lever for a mechanical actuator linkage adapted to separate adjacent ends of a pair of brake shoes carrying friction linings for engagement with a rotatable drum, and at least one shoe having a radial web, the invention comprising a blank including a body portion of substantial length having first and and second opposite ends, said body portion adjacent to said first end having an opening adapted to receive a pivotal connection with said radial web of said one brake shoe and having at said second end a lug projecting from one side edge of said body portion and lying in the same plane as that of said body portion, and an opening formed in said lug and an adjacent part of said body portion includes portions of different dimensions of which one portion of said opening disposed at least in part in said lug is of parallel sided elongated outline of a width slightly greater than the diameter of a flexible inextensible member for moving said lever angularly about said pivotal connection and said other portion disposed within said body portion is of circular outline of a diameter slightly greater than the diameter of a boss at the free end of said flexible inextensible member.

2. For a mechanical actuator linkage for separating adjacent ends of a pair of brake shoes carrying friction linings for engagement with a rotatable drum, and at least one shoe having a radial web, the invention comprising a lever including a body portion of substantial length having first and second opposite ends, said body portion adjacent to said first end having an opening adapted to receive a pivotal connection with said radial web of said one brake shoe and having at said second end a lug projecting from one side edge of said body portion and lying in the same plane as that of said body portion, and an opening formed in said lug and an adjacent part of said body portion includes portions of different dimensions of which one portion of said opening disposed at least in part in said lug is of parallel sided elongated outline of a width slightly greater than the diameter of a flexible inextensible member for moving said lever angularly about said pivotal connection, and said other portion of said opening disposed within said body portion is of circular outline of a diameter slightly greater than the diameter of a boss at the free end of said inextensible member, wherein said lug is deformed through substantially 90° along a fold line traversing the said one portion of said opening to form an abutment part lying in a plane substantially parallel with a main longitudinal axis of said body portion, said abutment part forming an abutment for the inner end of said boss.

3. In an internal shoe-drum brake comprising a stationary back plate, first and second arcuate brake shoes mounted on said back plate with at least one pair of ends adjacent each other, each shoe having a radial web and carrying a friction lining for engagement with a rotatable drum and a mechanical actuator for separating said adjacent ends of said shoes, said mechanical actuator comprising a pivotal connection between said first end of said lever and said radial web of said first shoe, a flexible inextensible brake applying member, a detachable coupling between said second end of said lever and said brake applying member, and a strut chordal with respect to the axis of rotation of said drum engaging at opposite ends between said second shoe and an intermediate point in the length of said lever, the invention wherein said lever comprises a substantially flat body portion of substantial length formed at said second end with a lug lying in the same plane as that of said body portion and extending away from said drum from the side edge of said body portion remote from said drum, and said lug and an adjacent part of said body portion are provided with an opening which includes portions of different dimensions of which a first portion terminating at an end adjacent to said drum is of a diameter slightly greater than the diameter of a boss at the free end of said brake applying member, and a second portion of said opening disposed at least in part in said lug is of parallel sided elongated outline of a width slightly greater than the diameter of said brake applying member, wherein said lug is deformed with respect to said body portion through substantially 90° along a fold line traversing said second portion of said opening to form an abutment part lying in a plane substantially parallel with a main longitudinal axis of said body and having opposed faces of which one face, which lies adjacent to said drum, is engaged by the inner end of said boss for which it forms an abutment.

4. For the construction of a lever for a mechanical actuator linkage adapted to separate adjacent ends of a pair of brake shoes carrying friction linings for engagement with a rotatable drum, and at least one shoe having a radial web, the invention comprising a blank including a body portion of substantial length having first and second opposite ends, said body portion adjacent to said first end having an opening adapted to receive a pivotal connection with said radial web of said one brake shoe and having at said second end a lug projecting from one side edge of said body portion and lying in the same plane as that of said body portion, and said lug and an adjacent part of said body portion comprise an integral extension formed by a pair of limbs, said limbs defining between adjacent edges an open-ended opening including an inner portion of a width slightly greater than the diameter of a flexible inextensible member for moving said lever angularly about said pivotal connection and an outer portion of a width slightly greater than the diameter of a boss at the free end of said flexible inextensible member.

5. The invention as claimed in claim 4, wherein portions of said edges of said limbs which define said inner portions of said opening are parallel with each other.

6. The invention as claimed in claim 4, wherein portions of said edge of said limbs which define said inner portions of said opening converge towards an end of said inner portion remote from said outer portion.

7. The invention as claimed in claim 6, wherein said edge portion of at least one of said limbs is formed at an intermediate point in its length with an inwardly extending portion having a straight inner face parallel with and spaced from a complementary face on said edge portion of said other limb.

8. For a mechanical actuator linkage for separating adjacent ends of a pair of brake shoes carrying friction linings for engagement with a rotatable drum, and at least one shoe having a radial web, the invention comprising a lever including a body portion of substantial length having first and second opposite ends, said body portion adjacent to said first end having an opening adapted to receive a pivotal connection with said radial web of said one brake shoe and having at said second end a lug projecting from one side edge of said body portion and lying in the same plane as that of said body portion, and an opening formed in said lug and an adjacent part of said body portion includes portions of different dimensions of which one portion of said opening disposed at least in part in said lug is of a width slightly greater than the diameter of a flexible inextensible member for moving said lever angularly about said pivotal connection, and said other portion of said opening is of dimensions slightly greater than those of a boss at the free end of said inextensible member, wherein said lug is deformed through substantially 90° along a fold line traversing the said one portion of said opening to form an abutment part lying in a plane substantially parallel with a main longitudinal axis of said body portion, said abutment part forming an abutment for the inner end of said boss.

9. The invention as claimed in claim 8, wherein the axis of the portion of the opening within the abutment part subtends an angle of at least 90° with respect to a plane containing said body portion, and said fold line is substantially normal to said main longitudinal axis of the portion of said opening at said second end of said body portion.

10. In an internal shoe-drum brake comprising a stationary back plate, first and second arcuate brake shoes mounted on said back plate with at least one pair of ends adjacent each other, each shoe having a radial web and carrying a friction lining for engagement with a rotatable drum and a mechanical actuator for separating said adjacent ends of said shoes, said mechanical actuator comprising a pivotal connection between said first end of said lever and said radial web of said first shoe, a flexible inextensible brake applying member, a detachable coupling between said second end of said lever and said brake applying member, and a strut chordal with respect to the axis of rotation of said drum engaging at opposite ends between said second shoe and an intermediate point in the length of said lever, the invention wherein said lever comprises a substantially flat body portion of substantial length formed at said second end with a lug lying in the same plane as that of said body portion and extending away from said drum from the side edge of said body portion remote from said drum, and said lug and an adjacent part of said body portion are provided with an opening which includes portions of different dimensions of which a first portion terminating at an end adjacent to said drum is of dimensions slightly greater than those of a boss at the free end of said brake applying member, and a second portion of said opening disposed at least in part in said lug is of a width slightly greater than the diameter of said brake applying member, wherein said lug is deformed with respect to said body portion through substantially 90° along a fold line traversing said second portion of said opening to form an abutment part lying in a plane substantially parallel with a main longitudinal axis of said body and having opposed faces of which one face, which lies adjacent to said drum, is engaged by the inner end of said boss for which it forms an abutment.

11. The invention as claimed in claim 10, wherein said lever is pivotally connected to said web of said first shoe on the side of said web adjacent to said back plate towards which said abutment part extends.

12. For a mechanical actuator linkage for separating adjacent ends of a pair of brake shoes carrying friction linings for engagement with a rotatable drum, and at least one shoe having a radial web, the invention comprising a lever including a body portion of substantial length having first and second opposite ends, said body portion adjacent to said first end having an opening adapted to receive a pivotal connection with said radial web of said one brake shoe and having at said second end a lug projecting from one edge of said body portion and lying in the same plane as that of said body portion, and said lug and an adjacent part of said body portion comprises an integral extension formed by a pair of limbs, said limbs defining between adjacent edges an open-ended opening including an inner portion of a width slightly greater than the diameter of a flexible inextensible member for moving said lever angularly about said pivotal connection and an outer portion of a width slightly greater than the diameter of a boss at the free end of said inextensible member, wherein said lug is deformed through substantially 90° along a fold line traversing the said inner portion of said opening to form an abutment part lying in a plane substantially parallel with a main longitudinal axis of said body portion, said abutment part forming an abutment for the inner end of said boss.

13. In an internal shoe-drum brake comprising a stationary back plate, first and second arcuate brake shoes mounted on said back plate with at least one pair of ends adjacent each other, each shoe having a radial web and carrying a friction lining for engagement with a rotatable drum and a mechanical actuator for separating said adjacent ends of said shoes, said mechanical actuator comprising a pivotal connection between said first end of said lever and said radial web of said first shoe, a flexible inextensible brake applying member, a detachable coupling between said second end of said lever and said brake applying member, and a strut chordal with respect to the axis of rotation of said drum engaging at opposite ends between said second shoe and an intermediate point in the length of said lever, the invention wherein said lever comprises a substantially flat body portion of substantial length formed at said second end with a lug lying in the same plane as that of said body portion and extending away from said drum from the side edge of said body portion remote from said drum, and said lug and an adjacent part of said body portion comprise an integral extension formed by a pair of limbs, said limbs defining between adjacent edges an open-ended opening including an outer portion terminating at an end adjacent to said drum of a width slightly greater than the diameter of a boss at the free end of said brake applying member, and an inner portion of a width slightly greater than the diameter of said brake applying member, wherein said lug is deformed with respect to said body portion through substantially 90° along a fold line traversing said inner portion of said opening to form an abutment part lying in a plane substantially parallel with a main longitudinal axis of said body and having opposed faces of which one face, which lies adjacent to said drum, is engaged by the inner end of said boss for which it forms an abutment.

* * * * *